US008220600B2

(12) United States Patent
Prahst

(10) Patent No.: US 8,220,600 B2
(45) Date of Patent: Jul. 17, 2012

(54) INTERNALLY VENTILATED DISC BRAKE

(75) Inventor: Alexander Prahst, Wimsheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 647 days.

(21) Appl. No.: 11/878,152

(22) Filed: Jul. 20, 2007

(65) Prior Publication Data

US 2008/0017460 A1    Jan. 24, 2008

(30) Foreign Application Priority Data

Jul. 21, 2006    (DE) .................. 10 2006 033 772

(51) Int. Cl.
*F16D 65/847* (2006.01)
(52) U.S. Cl. .................. 188/264 A; 188/218 XL
(58) Field of Classification Search ............ 188/218 XL, 188/264 A
See application file for complete search history.

(56) References Cited

U.S. PATENT DOCUMENTS

| | | | |
|---|---|---|---|
| 2,368,621 A | | 2/1945 | Tack |
| 2,410,195 A | * | 10/1946 | Baselt et al. ............ 188/218 XL |
| 2,464,754 A | | 3/1949 | Tack |
| 3,142,364 A | * | 7/1964 | Mikkelson ............... 188/264 R |
| 3,391,763 A | * | 7/1968 | Severson ............... 188/218 XL |
| 3,623,579 A | * | 11/1971 | Hendrickson et al. ... 188/218 XL |
| 3,732,953 A | * | 5/1973 | Huet ....................... 188/218 XL |
| 5,107,966 A | | 4/1992 | Metzler et al. | |

FOREIGN PATENT DOCUMENTS

| | | |
|---|---|---|
| DE | 37 40 309 A1 | 6/1989 |
| DE | 3740309 A1 * | 6/1989 |
| DE | 201 05 756 U1 | 7/2001 |
| DE | 10 2005 033 352 A1 | 1/2007 |
| DE | 102005033352 A1 | 1/2007 |
| EP | 0352502 A1 | 1/1990 |
| EP | 0 701 072 A1 | 3/1996 |
| FR | 2746156 A1 | 9/1997 |
| JP | 08028613 A * | 2/1996 |
| JP | 2001-159435 A | 6/2001 |
| JP | 2003278810 A | 10/2003 |

OTHER PUBLICATIONS

German Search Report dated Apr. 3, 2008 with an English translation (Nine (9) pages).
European Search Report dated Jun. 23, 2009.

* cited by examiner

*Primary Examiner* — Thomas J Williams
(74) *Attorney, Agent, or Firm* — Leydig, Voit & Mayer, Ltd.

(57) ABSTRACT

An internally ventilated disc brake comprising a brake disc, having two friction rings that are spaced apart by ribs. Air cooling channels are formed between the ribs with at least one heat dissipating element provided between the friction rings. The two friction rings and the heat dissipating element form an essentially integral molding so that the heat dissipating element is cast into the molding at least in certain areas. The heat dissipating element projects into at least one cooling air channel at least in certain areas and is disposed substantially in a parting plane of the molding, the parting plane extending parallel to the friction rings.

7 Claims, 6 Drawing Sheets

INTERNALLY VENTILATED DISC BRAKE

RELATED APPLICATIONS

This application claims the benefit of priority to German patent application number 10 2006 033 772.7, filed Jul. 21, 2006, the disclosure of which is incorporated by reference herein in its entirety.

BACKGROUND AND SUMMARY OF THE INVENTION

The present invention relates to an internally ventilated disc brake having a brake disc, which consists of two friction rings, which are arranged spaced apart by means of ribs, between which are formed a plurality of air cooling channels, at least one heat dissipating element being arranged between the friction rings.

During the disc braking action heat is generated by the brake pads in the friction rings of the brake disc. This generated heat must be continuously dissipated for the operating safety of the disc brake. To fulfill this purpose, there are, for example, systems that include a heat dissipating element in a molding adapted to the shape of a cooling air channel and which later, after the manufacturing process of the brake disc, may be placed stationarily inside the cooling air channel. Such prior art systems are, however, very complicated and exhibit at most only a relatively unsatisfactory heat dissipating behavior.

An object of the invention is to provide an internally ventilated disc brake that enables an improved dissipation of heat from the brake disc with simultaneously a simpler and more economical design.

The foregoing objective has been achieved based on the recognition that at the existing rate of air flow the internal cooling of the brake disc may be increased, if the air contact surface of the cooling air channels is enlarged. The present invention solves this problem in that, during the manufacturing process of an internally ventilated disc brake, at least one heat dissipating element, that is to be cast or molded into the brake disc is assigned to a molding that forms the brake disc. The heat dissipating element is disposed, according to the present invention, in the parting plane or the center plane of the molding and is cast into the molding, at least in certain places. This provides that the heat generated by friction at the friction rings, is radiated or transferred to the heat dissipating element and from there can be carried away with the cooling air. The heat dissipating element may be advantageously disposed in the molding so that at the same time it projects, at least in certain places, into at least one cooling air channel of the brake disc. However, it is regarded as especially advantageous if the heat dissipating element is constructed or disposed in the molding such that, following the manufacturing process of the brake disc, the heat dissipating element projects into a plurality of cooling air channels or into all of the cooling air channels formed on the brake disc.

The early insertion or incorporation of the heat dissipating element into the molding, as early as during the casting operation or the manufacturing process of the brake disc, makes it possible to realize an especially simple and inexpensive and, thus, extremely effective configuration of a brake disc provided with a heat dissipating element. Thus, the manufacturing of the molding with an integrated heat dissipating element is carried out in a single molding process without having to finish the heat dissipating element itself at a later date. Arranging the heat dissipating element in the parting plane of the molding (this plane extending substantially parallel to the friction rings) has the advantage that the heat dissipating element in this position can develop very good efficiency, since, as a result, the air contact surface of the cooling air channels is very effectively enlarged.

The radial reach of the heat dissipating element may conform to the radial reach of the ribs and/or the radial reach of the cooling air channels. The specific configuration of the ribs and/or the cooling air channels themselves is unimportant to the scope of the invention because the heat dissipating element can be adapted in virtually any arbitrary way to the ribs and/or the cooling air channels. In this context the concept of a parting plane is defined as the parting plane of a mold for manufacturing the molding. This parting plane is advantageously at the same time the center plane of the molding. In manufacturing the molding, the heat dissipating element may be placed in this parting plane and held there during the manufacturing process.

The present invention provides that the heat dissipating element exhibits a cross section preferably in the shape of an annular ring and is constructed essentially as a disk-shaped and/or plate-shaped component. This guarantees an especially simple and, in addition, an especially optimal manufacturing process.

The heat dissipating element itself may be constructed as a single walled and/or a double walled component. A single wall configuration guarantees a very simple and inexpensive manufacture of the heat dissipating element, whereas the double wall configuration may exhibit an even better heat dissipation value.

Preferably, the heat dissipating element can exhibit material protrusions and/or outwardly curved sections of material in the area of the cooling air channels. The material protrusions and/or the outwardly curved sections of material may be made preferably by way of a punching, compression molding or embossing process. Thus, a plurality of material protrusions and/or outwardly curved sections of material may be provided quickly and simply on the heat dissipating element. It is also contemplated, however, to construct the material protrusions as separate components that may be, for example, subsequently welded, soldered and/or riveted on the outside of the heat dissipating element.

In this connection, the material protrusions are constructed preferably in a knob-like manner. The material protrusions can also be constructed in a cone-like or pin-like manner. In contrast, the outwardly curved sections of material may be constructed substantially in a web-like or tab-like manner. Compared to smooth components, the material protrusions and/or the outwardly curved sections of material make it possible to obtain a heat dissipation behavior and/or flow behavior that is improved a second time.

Furthermore, the heat dissipating element can be provided with cavities and/or perforations at least in the area of the ribs, provided on the friction rings, in order to guarantee a safe and reliable connection between the two friction rings. The cavities and/or perforations can be adapted advantageously in shape and number corresponding to the ribs provided on the friction rings.

An especially currently preferred embodiment is to make the heat dissipating element of sheet metal, in particular of aluminum, steel, copper or their alloys. A heat dissipating element that is made of sheet metal has a weight advantage, is economical to make and, in addition, is easy to process. The heat dissipating element should also especially preferably exhibit a higher heat coefficient than the friction ring, respectively the molding.

Other objects, advantages and novel features of the present invention will become apparent from the following detailed description of the invention when considered in conjunction with the accompanying drawings.

DETAILED DESCRIPTION OF THE DRAWINGS

Figure 1:
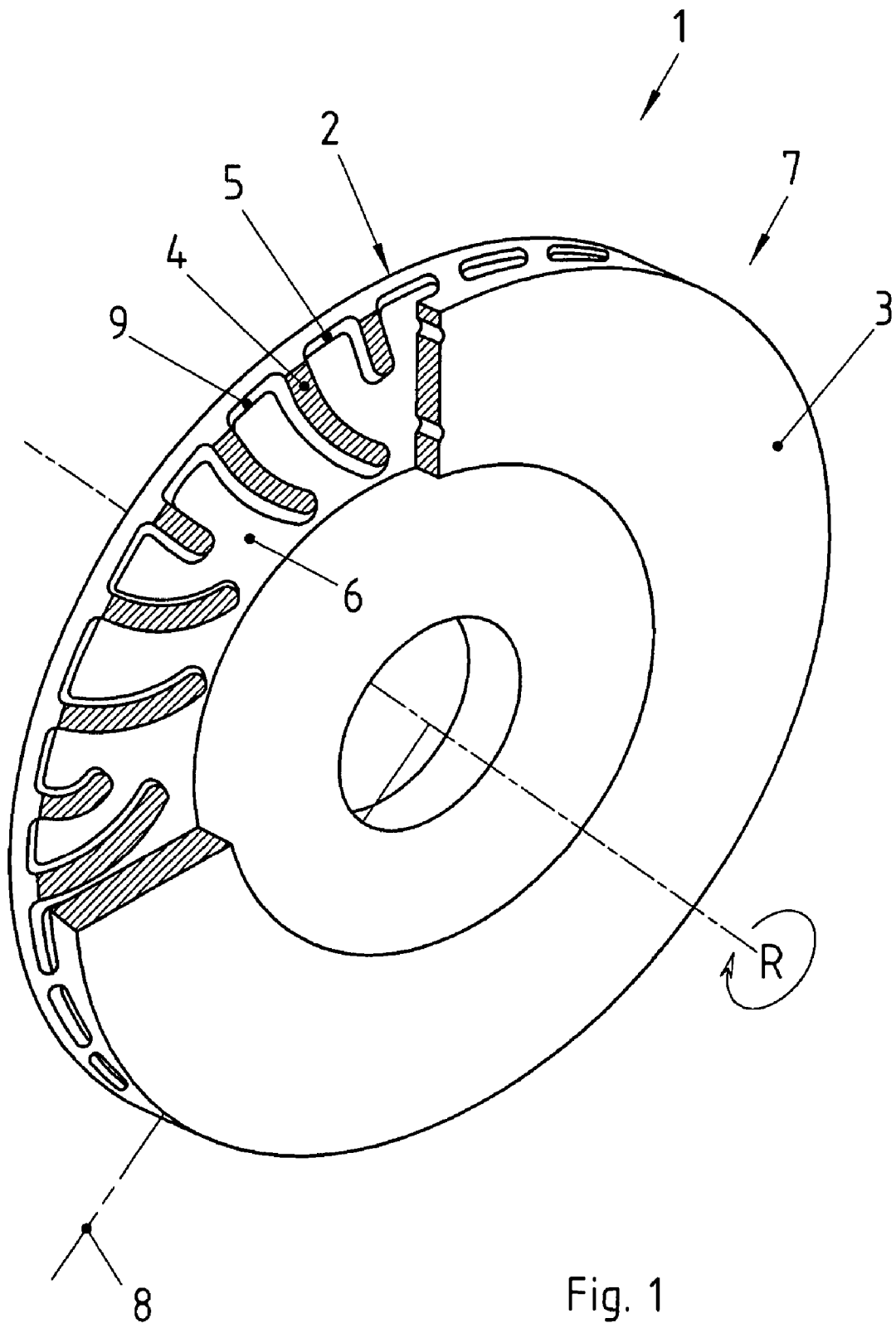
FIG. 1. is a schematic perspective view of an internally ventilated disc brake with an integrated heat dissipating element according to the present invention.

The internally ventilated disc brake 1 shown in FIG. 1, includes a brake disc which has first and second friction rings 2, 3 that interact in a well-known manner with the brake pads. The first friction ring 2 is connected to the second friction ring 3 by a plurality of ribs 4, between which a plurality of cooling air channels 5 are formed. At the brake disc rotating in the direction R, an air current is generated between the ribs 4 to carry away the heat generated by the friction between the brake pads and the friction rings 2, 3 of the brake disc during the braking action. Thereby, cooling of the disc brake 1 takes place.

In order to enhance the air flow rate of the internal cooling of the brake disc or rather in order to enlarge the air-cooled surface of the cooling air channels 5, the brake disc has a heat dissipating element 6. The heat dissipating element 6 and the friction rings 2, 3 and/or the brake disc form a substantially integral molding 7 designated generally numeral.

The heat dissipating element 6 is disposed or cast into the molding 7 so as to project, at least in certain areas, into the brake disc cooling air channels 5. Therefore, the heat dissipating element 6 is configured so as to run essentially parallel to the friction rings 2, 3 in the parting and/or center plane 8 of the molding 7. The heat dissipating element 6 has a substantially circular cross section and is constructed as a plate-shaped component. Hence, it is contemplated to make the plate-shaped component from a metal sheet or the like. It is also contemplated to construct the heat dissipating element from several individual parts and/or to provide several identical or non-identical heat dissipating elements in the brake disc. In this respect, the configuration of the heat dissipating element may be adapted substantially to the air cooling channel that runs in the brake disc. The wall thickness of the component or its axial reach conforms preferably to the axial reach of the air cooling channels 5. The heat dissipating element 5 is, however, constructed preferably to guarantee adequate flow behavior between the exterior walls 9 of the air cooling channels 5 and the exterior sides of the heat dissipating element 6.

The heat dissipating element 6 has cavities and/or perforations 10 in the area of the ribs 4 that prevent the ribs 4 from being separated by the heat dissipating element 6 during the manufacturing or casting process and/or result in just an inadequate positive connection between the friction rings 2, 3. The cavities and/or the perforations 10 are adapted in shape and number to the ribs 4, provided on the friction rings 2, 3, and/or to the molded elements for forming the ribs 4 during the manufacturing process and guarantee a material-fitting connection between the friction rings 2, 3, on one hand, and a shape-fitting connection between the ribs 4 and the heat dissipating element 6.

Figure 2:
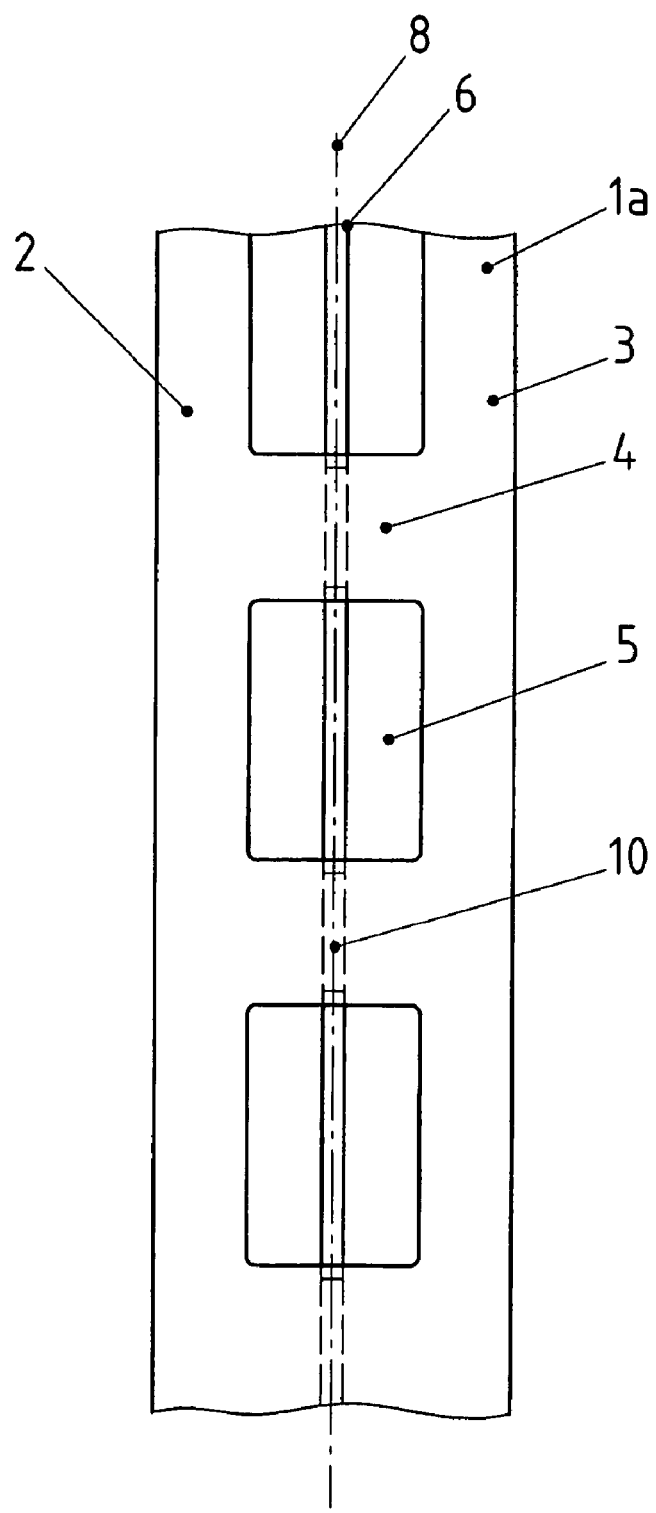
FIG. 2 is a side view of an axial exterior sub-area of the disc brake, shown in FIG. 1.

FIG. 2 is an enlarged side view of an axial exterior sub-area of the disc brake shown in FIG. 1. The heat dissipating element 6 is shown between the brake disc and/or between the friction rings 2, 3 running parallel to the friction rings 2, 3 in the parting plane 8 of the molding and/or the brake disc. The heat dissipating element 6 is formed as a one-walled plate-shaped component and has perforations 10 in the area of the ribs 4. The heat dissipating element 6 has the effect that the heat generated at the brake disc is radiated over the friction rings 2, 3 to the heat dissipating element 6 and from there may be carried away in turn by cooling air flowing through the cooling air channels 5.

Figure 3:
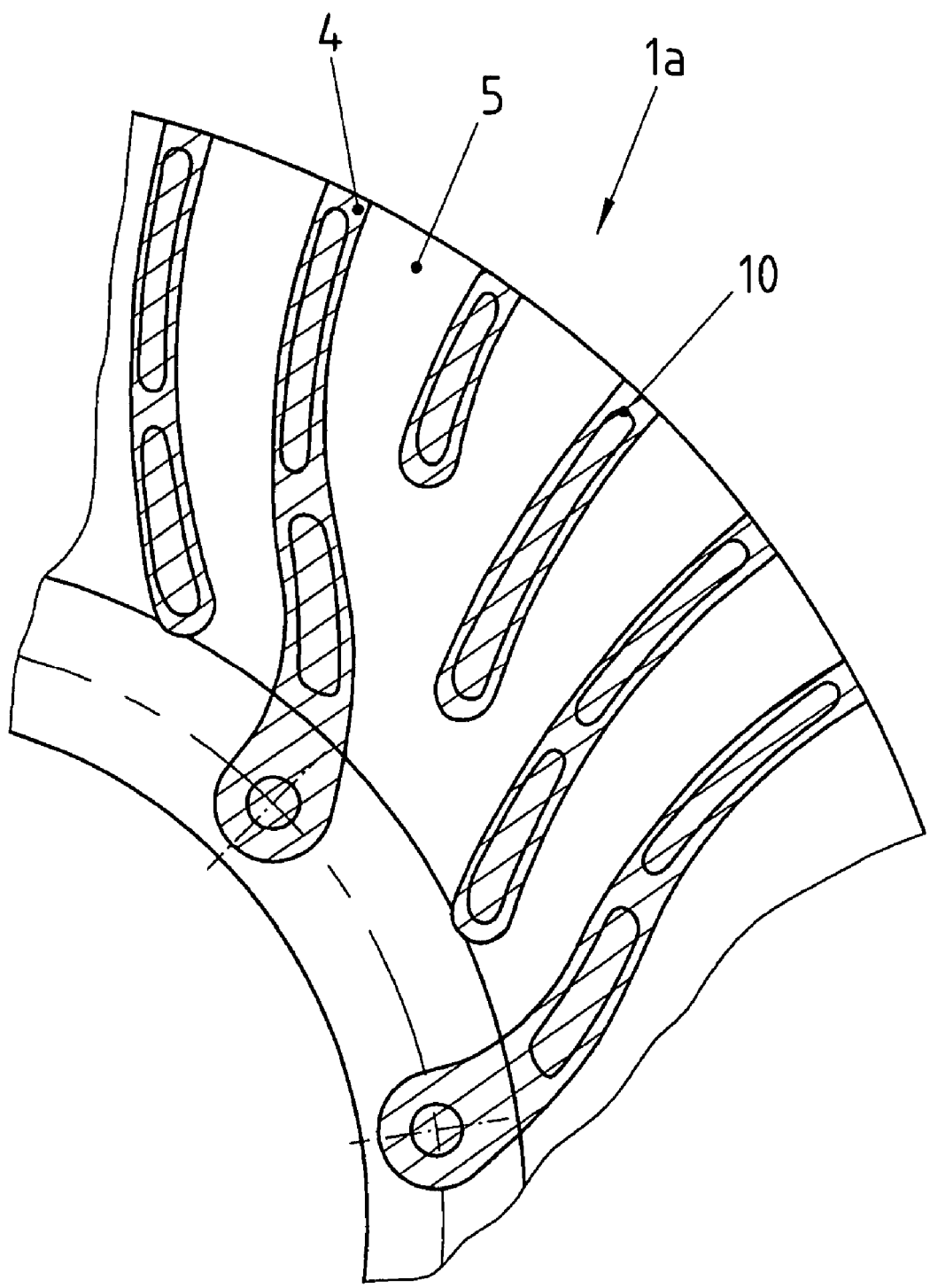
FIG. 3 is a detail of a radial section of the disc brake 1, show in FIG. 1.

FIG. 3 is a schematic drawing of a detail of a radial section of the brake disc and/or the disc brake 1 shown in FIG. 1, with a view of a subsection of the periphery of the heat dissipating element 6. The ribs 4 and the cooling air channels 5, are shown as well as the perforations 10 that are provided in the area of the ribs 4. The perforations 10 are constructed in this embodiment as oblong holes and are adapted to the contour, or rather the configuration, of the ribs 4. However, it is also contemplated to construct the perforations and/or the cavities, for example, as boreholes. The perforations and/or the cavities themselves may be, for example, punched, drilled and/or milled into the heat dissipating element.

Figure 4:
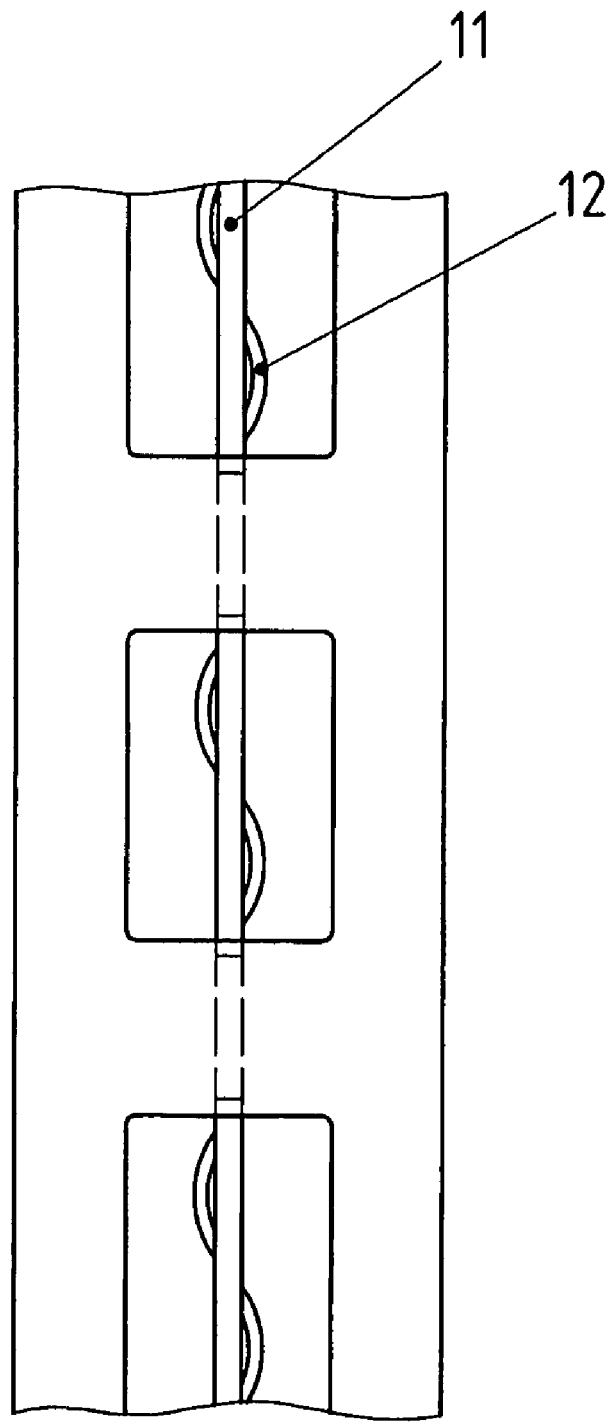
FIG. 4 is a side view of an axial exterior sub-area of a disc brake with a second embodiment of a heat dissipating element.

FIG. 4 depicts a second embodiment of a heat dissipating element 11 having material protrusions 12 constructed substantially as knobs and disposed on both exterior sides of the heat dissipating element 11. The material protrusions 12 may be provided merely in a singular or solitary manner on the radial exterior side of the heat dissipating element 11, or they may be disposed on both sides of the heat dissipating element so as to extend over the entire area of the cooling air channel and be distributed over the entire area of the exterior of the heat dissipating element 11. In this case the material protrusions 12 are configured as material protrusions, folded out of the actual heat dissipating element 11. For example, the material protrusions 12 can be made through a punching, compression molding or embossing process, thereby also forming folded-out tabs.

Figure 5:
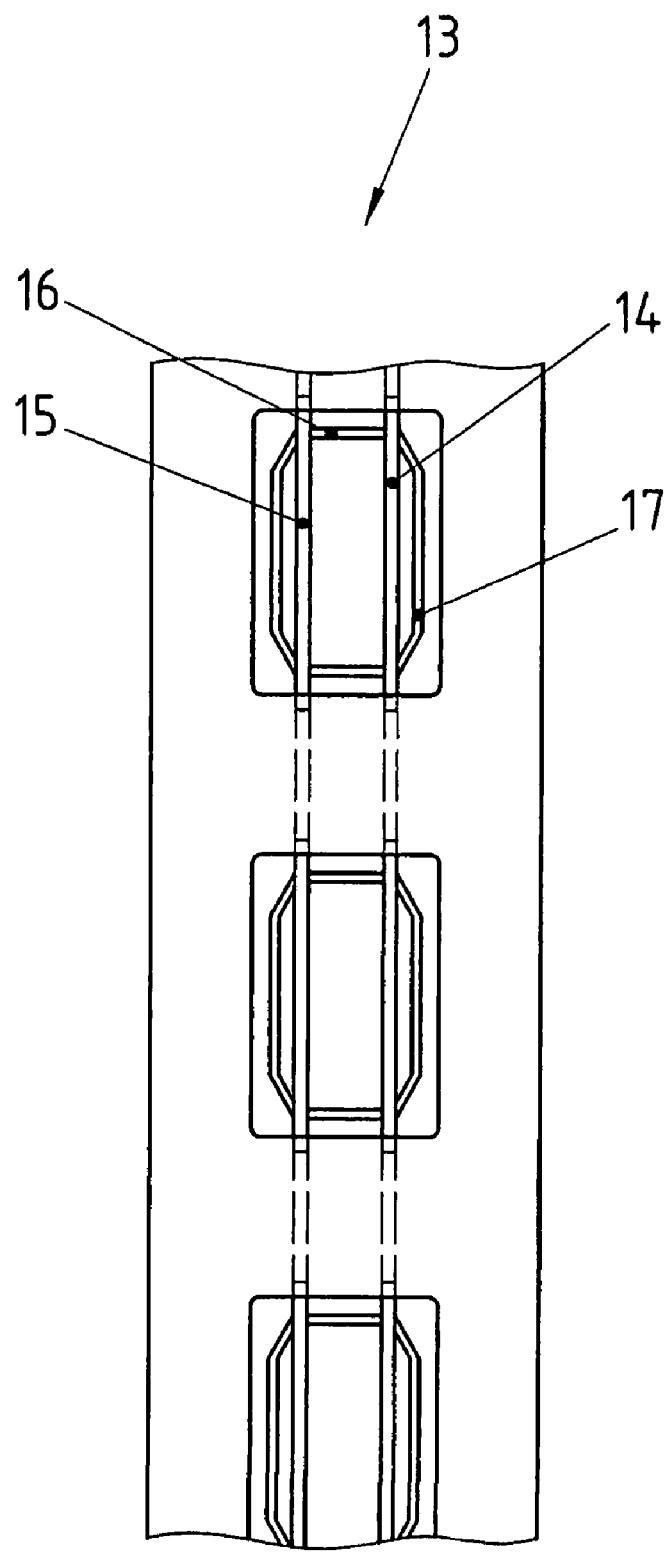
FIG. 5 is a side view of an axial exterior sub-area of a disc brake with a third embodiment of a heat dissipating element.

FIG. 5 shows a third embodiment of a heat dissipating element 13 constructed as a multi-walled or double walled component. The heat dissipating element 13 is made of two main ribs 14, 15, between which a plurality of cross struts 16 are disposed. Furthermore, the heat dissipating element 13 has web-like outwardly curved sections of material 17 folded out of the main ribs 14, 15 in a punching or compression molding process. Here, too, it is contemplated to connect the outwardly curved material sections 17 afterwards as separate components to the main ribs 14, 15. The advantage of this construction lies in the feature that, due to the doubled wall configuration and the outwardly curved material sections, the heat dissipating element 13 has a heat dissipating behavior and/or flow behavior that is improved a second time as compared to components with a single wall.

Figure 6:
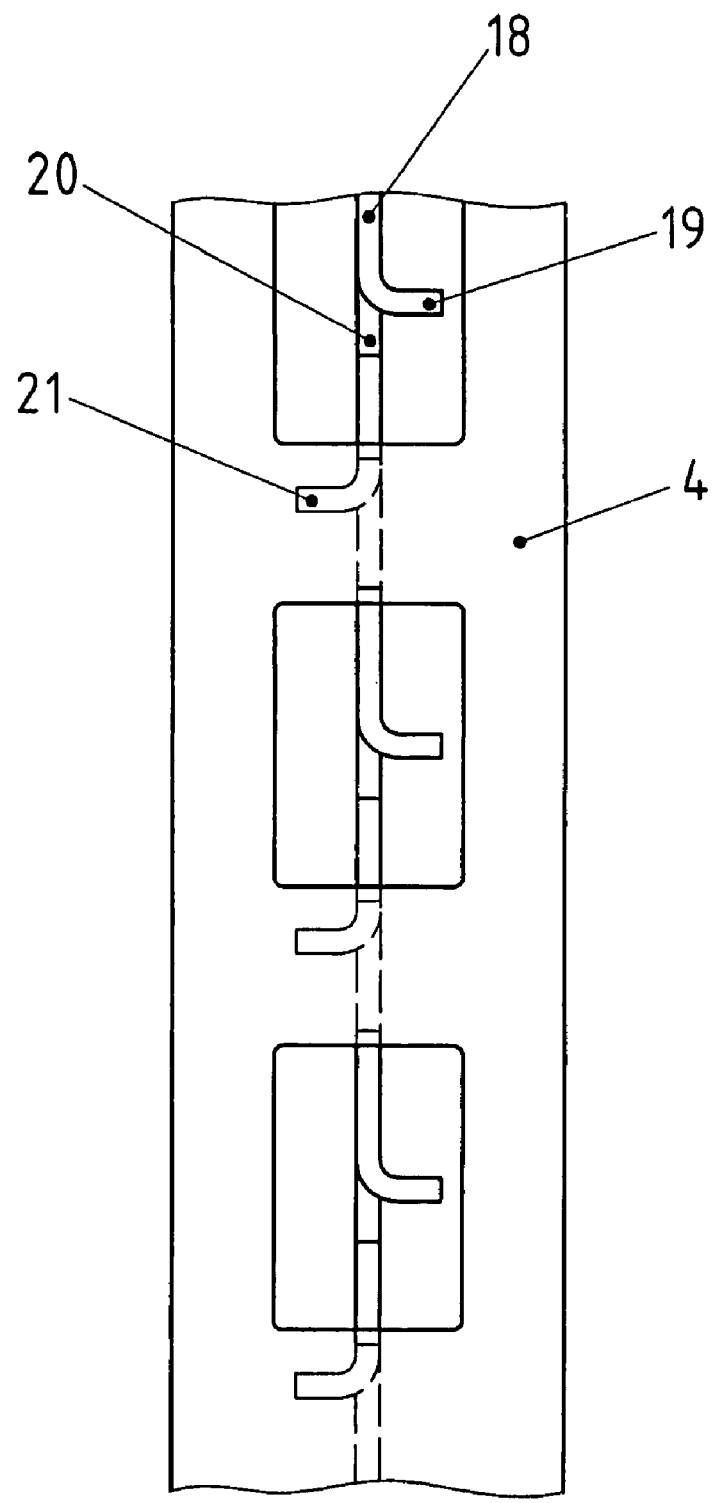
FIG. 6 is a side view of an axial exterior sub-area of a disc brake with a fourth embodiment of a heat dissipating element.

A fourth embodiment of a heat dissipating element 18 shown in FIG. 6 is also a single wall component that has outwardly curved sections of material 19 configured as tabs and/or wedge formations. The outwardly curved material 19 sections are folded out of the plate-shaped component in the punching or bending process and are exhibited in essence at an angle of 90 deg., relative to the exterior side 20 of the heat dissipating element 18. Furthermore, the heat dissipating element 18 has outwardly curved material sections 21 in the area of the ribs 4. The outwardly curved material sections guarantee an improved hold in the molding.

With the aid of the various configurations of the heat dissipating elements, as shown in FIGS. 1 to 6, the inner surface can be significantly enlarged and the air flow or the air swirl rate can be increased in the cooling air channels (the air flow or swirl being important for heat transfer), to influence the interface structure of the air flow and, as a result, to significantly increase the heat transmission coefficient at the heat dissipating element. The constructions that are shown here are not regarded in any way as exhaustive and are intended only to show possible embodiments of an internally ventilated disc brake comprising an integrated heat dissipating element, according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Internally ventilated disc brake, comprising:
a brake disc having two friction rings only spaced apart by ribs, a plurality of air cooling channels formed between the ribs and at least one heat dissipating element arranged between the friction rings wherein the two friction rings and the heat dissipating element comprise an integral molding so that the at least one heat dissipating element is cast into the molding in at least several areas, the at least one heat dissipating element projects into at least one of the brake disc cooling air channels in at least several areas, the at least one heat dissipating element is disposed substantially in a parting plane of the molding, said parting plane running parallel to the friction rings, the at least one heat dissipating element is configured as a double walled component formed of two main ribs and a plurality of cross struts disposed between the two main ribs, the heat dissipating element having an annular ring cross sectional shape configured substantially as a disc-shaped and/or plate-shaped component, the heat dissipating element running in the parting plane spaced from inner walls of the friction rings.

2. Disc brake as claimed in claim 1, wherein the at least one heat dissipating element has at least one of material protrusions and outwardly curved material sections of material in an area of the air cooling channels, the material protrusions and/or the outwardly curved material sections being punched, compressed molded or embossed.

3. Disc brake as claimed in claim 1, wherein the at least one dissipating element is sheet metal.

4. Disc brake as claimed in claim 3, wherein the sheet metal is aluminum steel, copper or alloys thereof.

5. Disc brake as claimed in claim 1, wherein the at least one heat dissipating element is constructed to have a higher heat coefficient than that of the friction ring, respectively the molding.

6. An internally ventilated disc brake, comprising:
two friction rings having inner walls disposed opposite each other;
ribs;
at least one heat dissipating element configured as a double walled component formed of two main ribs and a plurality of cross struts disposed between said two main ribs, said at least one heat dissipating element is provided with at least one of cavities and perforations in at least an area of the ribs on the friction rings;
said two friction rings only spaced apart by said ribs, a plurality of air cooling channels formed between said ribs and said at least one heat dissipating element disposed between said friction rings;
said two friction rings and said heat dissipating element defining an integral molding so that said at least one heat dissipating element is cast into said integral molding in at least several areas, said at least one heat dissipating element projecting into at least one of said brake disc cooling air channels in at least several areas, said at least one heat dissipating element disposed substantially in a parting plane of said integral molding, said parting plane running parallel to said two friction rings, said heat dissipating element running in said parting plane spaced from said inner walls of said friction rings.

7. Disc brake as claimed in claim 6, wherein the cavities and/or perforations are adapted in shape and number to the ribs.

* * * * *